(12) United States Patent
Kawakami

(10) Patent No.: US 8,755,062 B2
(45) Date of Patent: Jun. 17, 2014

(54) IMAGE FORMING APPARATUS

(71) Applicant: Kyocera Document Solutions Inc., Osaka (JP)

(72) Inventor: Satoshi Kawakami, Osaka (JP)

(73) Assignee: KYOCERA Document Solutions Inc., Kyoto (JP)

( * ) Notice: Subject to any disclaimer, the term of this patent is extended or adjusted under 35 U.S.C. 154(b) by 0 days.

(21) Appl. No.: 13/897,194

(22) Filed: May 17, 2013

(65) Prior Publication Data

US 2013/0321835 A1 Dec. 5, 2013

(30) Foreign Application Priority Data

May 31, 2012 (JP) ................................. 2012-124266

(51) Int. Cl.
*G06F 3/12* (2006.01)
*G06K 15/02* (2006.01)
*G06K 15/00* (2006.01)

(52) U.S. Cl.
USPC .......................... 358/1.13; 358/1.11; 358/1.16

(58) Field of Classification Search
USPC ............ 358/1.1, 1.2, 1.4, 1.5, 1.9, 1.11, 1.12, 358/1.13, 1.14, 1.15, 1.16, 1.17, 1.18
See application file for complete search history.

(56) References Cited

U.S. PATENT DOCUMENTS

2010/0169835 A1   7/2010   Tabata et al.

FOREIGN PATENT DOCUMENTS

| JP | 2005-074715 A | 3/2005 |
|---|---|---|
| JP | 2010-171961 A | 8/2010 |

*Primary Examiner* — Thierry L Pham
(74) *Attorney, Agent, or Firm* — Studebaker & Brackett PC

(57) ABSTRACT

An image forming apparatus includes a display section and a control unit. The display section is configured to display a plurality of picture segments. The control unit is configured to execute a display operation to display the plurality of picture segments. The plurality of picture segments correspond to a plurality of options corresponding to an image formation related function. The control unit executes a picture segment selection operation to select picture segments, of which number is equal to a predetermined display number, as normal picture segments among the plurality of picture segments. The control unit executes a prominent display operation to select picture segments, of which number is larger than the predetermined display number, as provisional picture segments among the plurality of picture segments and to allow the display section to prominently display the provisional picture segments during a predetermined prominent display time.

10 Claims, 11 Drawing Sheets

IMAGE FORMING APPARATUS

INCORPORATION BY REFERENCE

The present application claims priority under 35 U.S.C. §119 to Japanese Patent Application No. 2012-124266, filed May 31, 2012. The contents of this application are incorporated herein by reference in their entirety.

BACKGROUND

The present disclosure relates to image forming apparatuses and particularly relates to a technique which allows the user to select a setting content of an image formation related function.

There has been a technique known in the art in which in order to execute various image formation related functions that image forming apparatus has, an operation screen, which selectably displays optional picture segments (hereinafter referred to as picture segments), such as icons, corresponding to options that can be setting contents of the respective functions, is displayed on a display device. With this technique, the user can input any setting content of each function through an easy operation of selecting a picture segment.

Further, since the size of the operation screen is limited according to the size of the display device, the number of picture segments capable of being displayed on the operation screen is limited accordingly. To tackle this problem, techniques have been known in which picture segments to be displayed on the operation screen are changed for display on the display device.

Referring to such a technique, for example, there is a technique which alternatively switches modes between a normal display mode, in which all function selection keys (picture segments) are arranged on an image formation related function listing screen (operation screen), and a simple display mode, in which only usually-used function selection keys are arranged on the image formation related function listing screen according to the user's preference or proficiency. Alternatively, in some imaging device, selectable menu items are superimposed to display menu items as much as possible.

SUMMARY

An image forming apparatus according to the present disclosure includes a display section and a control unit. The display section is configured to display a plurality of picture segments. The control unit is configured to execute a display operation to display the plurality of picture segments. The plurality of picture segments correspond to a plurality of options corresponding to an image formation related function. The control unit executes a picture segment selection operation to select picture segments, of which number is equal to a predetermined display number, as normal picture segments among the plurality of picture segments. The control unit executes a prominent display operation to select picture segment, of which number is larger than the predetermined display number, as provisional picture segments among the plurality of picture segments and to allow the display section to prominently display the provisional picture segments during a predetermined prominent display time.

DETAILED DESCRIPTION

Embodiment 1

Figure 1:
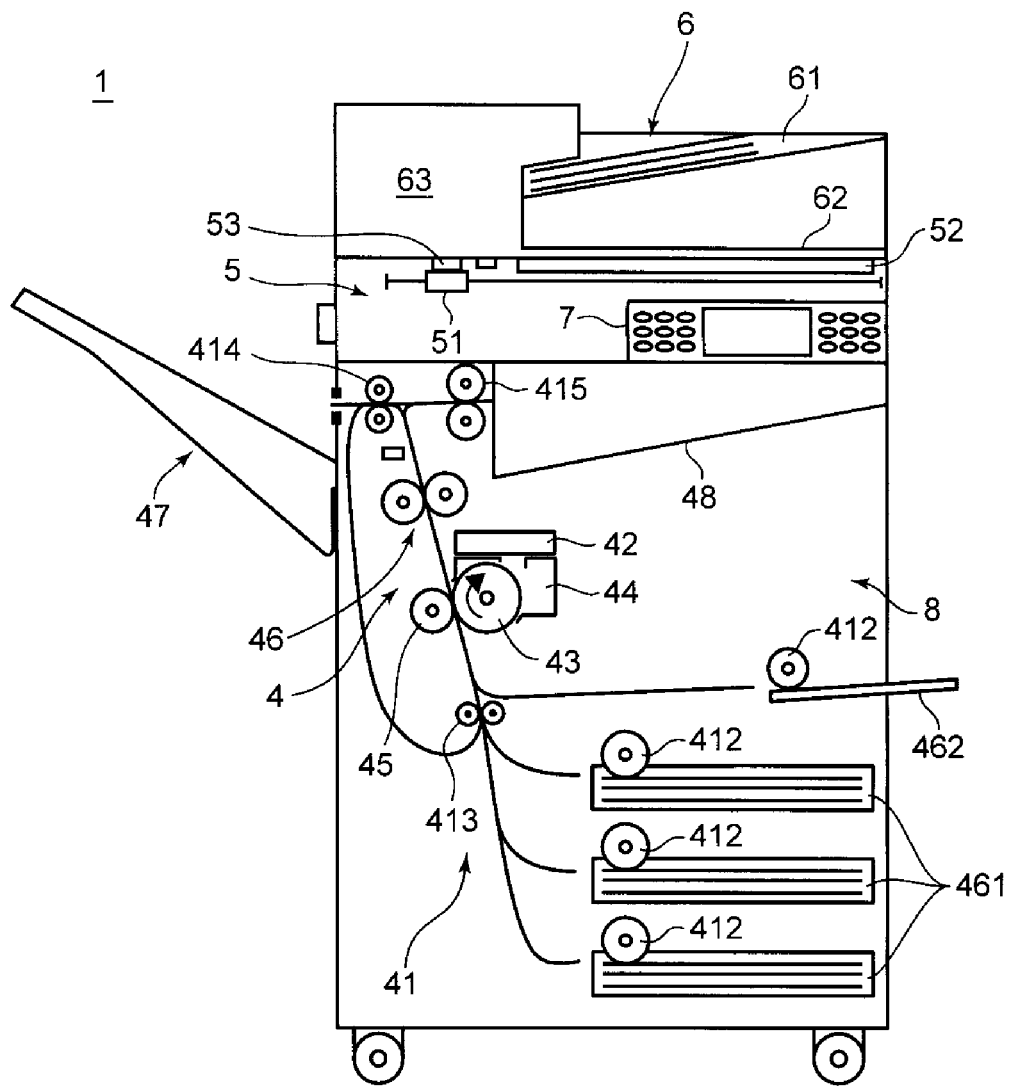
FIG. 1 is a schematic structural diagram of a multifunction peripheral as one example of an image forming apparatus according to one embodiment of the present disclosure.

One embodiment according to the present disclosure will be described below with reference to the accompanying drawings. FIG. 1 is a schematic structural diagram showing a multifunction peripheral 1 as one example of an image forming apparatus according to the present disclosure.

As shown in FIG. 1, the multifunction peripheral 1 includes an original document reading unit 5, an original document feeding unit 6, a main body part 8, and an operation unit 7.

The original document reading unit 5 is arranged on the top of the main body part 8. The original document reading unit 5 includes a scanner section 51 composed of an exposure lamp, a charge coupled device (CCD), etc., a copy holder 52 formed of a transparent member, such as glass or the like, and an original document reading slit 53.

The scanner section 51 is movable by a drive unit (not shown). In order to read an original document placed on the copy holder 52, the scanner section 51 scans an image of the original document, while being moved along the surface of the original document at a site that faces the copy holder 52, and then outputs obtained image data to a control unit 10, which will be described later. Alternatively, in order to read an original document fed from the original document feeding unit 6, the scanner section 51 is moved to a site that faces the original document reading slit 53. Then, the scanner section 51 obtains an image of the original document through the original document reading slit 53 in synchronization with conveyance of the original document by the original document feeding unit 6 and outputs obtained image data to the control unit 10, which will be described later.

The original document feeding unit 6 is arranged above the original document reading unit 5. The original document feeding unit 6 includes an original document placement section 61, an original document ejection section 62, and an original document conveyance mechanism 63. An original document is to be placed on the original document placement section 61. The original document ejection section 62 ejects an original document from which an image has been read. The original document conveyance mechanism 63 feeds out original documents placed on the original document placement section 61 sheet by sheet to convey them to a position that faces the original document reading slit 53 and ejects each original document to the original document ejection section 62.

The main body part 8 includes a paper feed cassette 461, a manual feed tray 462, a paper feed roller 412, an image forming unit 4, a stacking tray 47, and an exit tray 48. The paper feed roller 412 feeds out paper sheet by sheet from the paper feed cassette 461 or the manual feed tray 462 to convey it to the image forming unit 4. The image forming unit 4 forms an image onto the conveyed paper. The stacking tray 47 and the exit tray 48 are destinations where the paper on which the image is formed is ejected.

The image forming unit 4 includes a paper conveyance section 41, an optical scanning device 42, a photosensitive drum 43, a developing section 44, a transfer section 45, and a fixing section 46.

The paper conveyance section 41 is provided in the middle of a paper conveyance path in the image forming unit 4. The paper conveyance section 41 includes a conveyance roller 413, a conveyance roller 414, and a conveyance roller 415, for example. The conveyance roller 413 supplies paper conveyed through the paper feed roller 412 to the photosensitive drum 43. The conveyance roller 414 conveys the paper to the stacking tray 47. The conveyance roller 415 conveys the paper to the exit tray 48.

The optical scanning device 42 outputs laser light on the basis of image data input to the control unit 10. The optical scanning device 42 scans the photosensitive drum 43 with the output laser light to form an electrostatic latent image onto the photosensitive drum 43.

The developing section 44 allows toner to adhere to the electrostatic latent image on the photosensitive drum 43 to form a toner image. The transfer section 45 transfers the toner image on the photosensitive drum 43 to paper. The fixing section 46 heats the paper to which the toner image is transferred to fix the toner image to paper.

Figure 2:
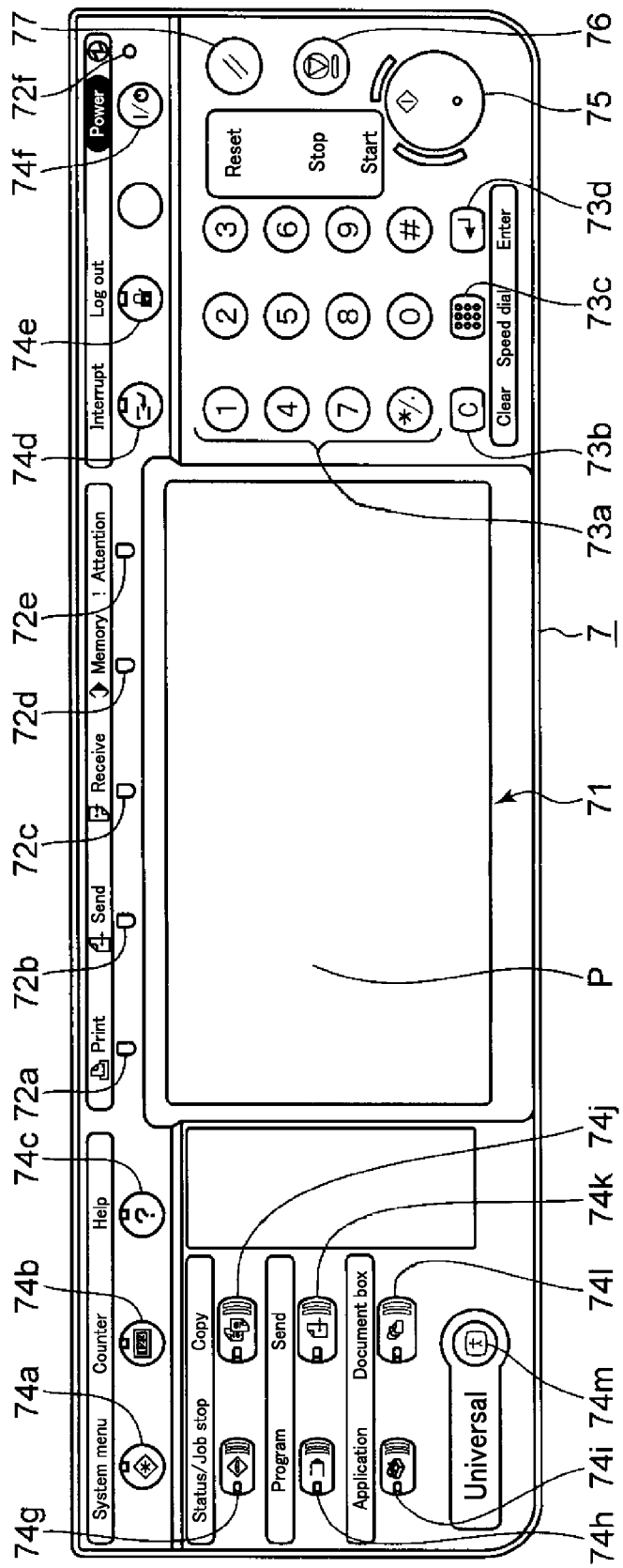
FIG. 2 is an explanatory drawing showing one example of an operation unit according to one embodiment of the present disclosure.

The operation unit 7 is provided on the front part of the multifunction peripheral 1 and is capable of receiving various operation instructions by the user. FIG. 2 is an explanatory drawing showing one example of the operation unit 7. As shown in FIG. 2, the operation unit 7 includes a touch panel 71, indicators 72a-72f, input keys 73a-73d, switches 74a-74m, a start key 75, a stop key 76, and a reset key 77.

The touch panel 71 includes a liquid crystal display device (display section) P having a function as a touch panel as an image formation related function. By the touch panel function, when the user touches a soft key displayed on the liquid crystal display device P, an instruction corresponding to a function of the pressed soft key is input to the touch panel 71. Further, by the touch panel function, a track of the position where the user touches on the liquid crystal display device P is input to the touch panel 71 as an instruction of a gesture operation. On the basis of the track information received at the touch panel 71, the control unit 10, which will be described later, receives input of the instruction of the gesture operation.

The touch panel 71 receives the instruction of the gesture operation. Examples of the gesture operation include tapping, pinching, swiping, flicking, etc. The tapping is an operation of lightly tapping the liquid crystal display device P. The pinching is an operation of pinching the liquid crystal display device P with two fingers or an operation of spreading the two fingers from such a pinching state. The swiping is an operation of sliding a finger with it kept in touch with the liquid crystal display device P as it is. The flicking is an operation of moving a finger so as to lightly sweeping the liquid crystal display device P.

The indicators 72a-72f are made of light emitting diodes or the like and are blinked or lighted on or off to indicate states of the multifunction peripheral 1. For example, the indicator 72a is blinked during printing. The indicator 72b is blinked during data sending to the outside. The indicator 72c is blinked during data receiving from the outside. The indicator 72d is blinked during access to data stored in a hard disk, a memory, etc. provided in the multifunction peripheral 1. The indicator 72e is lighted on or blinked upon occurrence of an abnormal event. The indicator 72f is lighted on during the time when the multifunction peripheral 1 is powered on.

The input keys 73a-73d are provided for input of numerals and signs and for deletion and confirmation of an input character string. For example, the input keys 73a are collectively called a numeral key group provided for input of numerals and signs. The input key 73b is generally called a clear key provided for deletion of an input character string. The input key 73c is generally called a speed key provided for reading and input of a character string stored in advance in a memory or the like. The input key 73d is generally called an enter key (return key) provided for confirmation of a character string input instruction or a soft key selection instruction.

The switches 74a-74m are switches for selection of a function to be executed by the control unit 10 among a plurality of image formation related functions that the control unit 10 is executable. Referring to a typical one, for example, the switch 74j is a switch for selection of a copy function for printing using image data read by the scanner section 51.

The start key 75 is provided to start each operation of various functions. The stop key 76 is provided to stop each operation of the various functions. The reset key 77 is provided to return each setting content of the various functions to the initial state.

Figure 3:
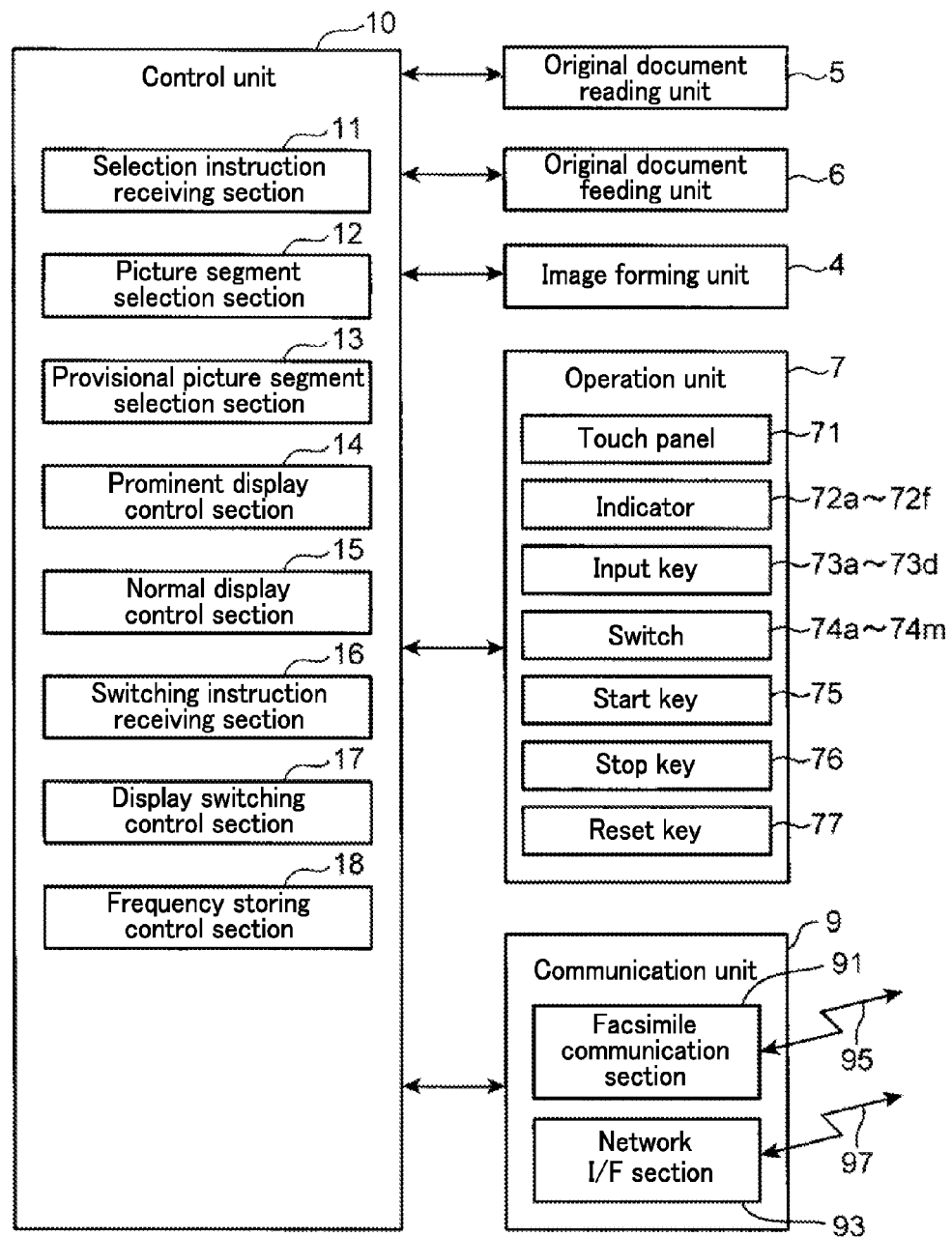
FIG. 3 is a block diagram showing one example of an electric configuration of the multifunction peripheral according to one embodiment of the present disclosure.

FIG. 3 is a block diagram showing one example of an electric configuration of the multifunction peripheral 1. In the multifunction peripheral 1, the original document reading unit 5, the original document feeding unit 6, the image forming unit 4, the operation unit 7, a communication unit 9, the control unit 10, etc. are connected together communicably. Description of the components assigned to the same reference numerals as those in FIGS. 1 and 2 is omitted hereinafter unless otherwise specified.

The communication unit 9 includes a facsimile communication section 91 and a network I/F section 93. The facsimile machine communication unit 91 is connected to a telephone line 95. The facsimile communication section 91 includes a network control unit (NCU) to control connection between the telephone line and the other party's facsimile machine and a modulator-demodulator circuit to modulate/demodulate signals for facsimile communication. The facsimile communication section 91 is configured to send image data read by the original document reading unit 5 to another facsimile machine via the telephone line 95 and to receive image data sent from another facsimile machine.

The network I/F section 93 is connected to a local area network (LAN) 97. The network I/F section 93 is a communication interface circuit for execution of communication between a terminal device connected to the LAN 97, such as a personal computer and the like, and the multifunction peripheral 1. The network I/F section 93 is configured to send image data read by the original document reading unit 5 to an external computer, such as a personal computer and the like, via the LAN 97 and to receive image data sent from an external computer.

The control unit 10 includes, for example, a central processing unit (CPU) to execute predetermined arithmetic operation, memories, such as a read only memory (ROM) to store predetermined control programs and a random access memory (RAM) to temporarily store data, storage media, such as a hard disc drive (HDD) to store various data, such as image data, etc., an application specific integrated circuit (ASIC) as a dedicate hardware capable of high speed processing of a predetermined operation, such as image processing, and peripheral circuits for them. The control unit 10 allows the CPU to execute the control programs stored in the ROM and the like to execute various processing and controls each operation of the components of the multifunction peripheral 1. Thus, the control unit 10 can execute the plurality of image formation related functions that the multifunction peripheral 1 has.

The control unit 10 can perform control to allow the user to input any of the setting contents of the image formation related functions. Specifically, the control unit 10 includes a selection instruction receiving section 11, a picture segment selection section 12, a provisional picture segment selection section 13, a prominent display control section 14, a normal display control section 15, a switching instruction receiving section 16, and a display switching control section 17. It is noted that a frequency storing control section 18 shown in FIG. 3 will be described later in another embodiment.

Figure 4:
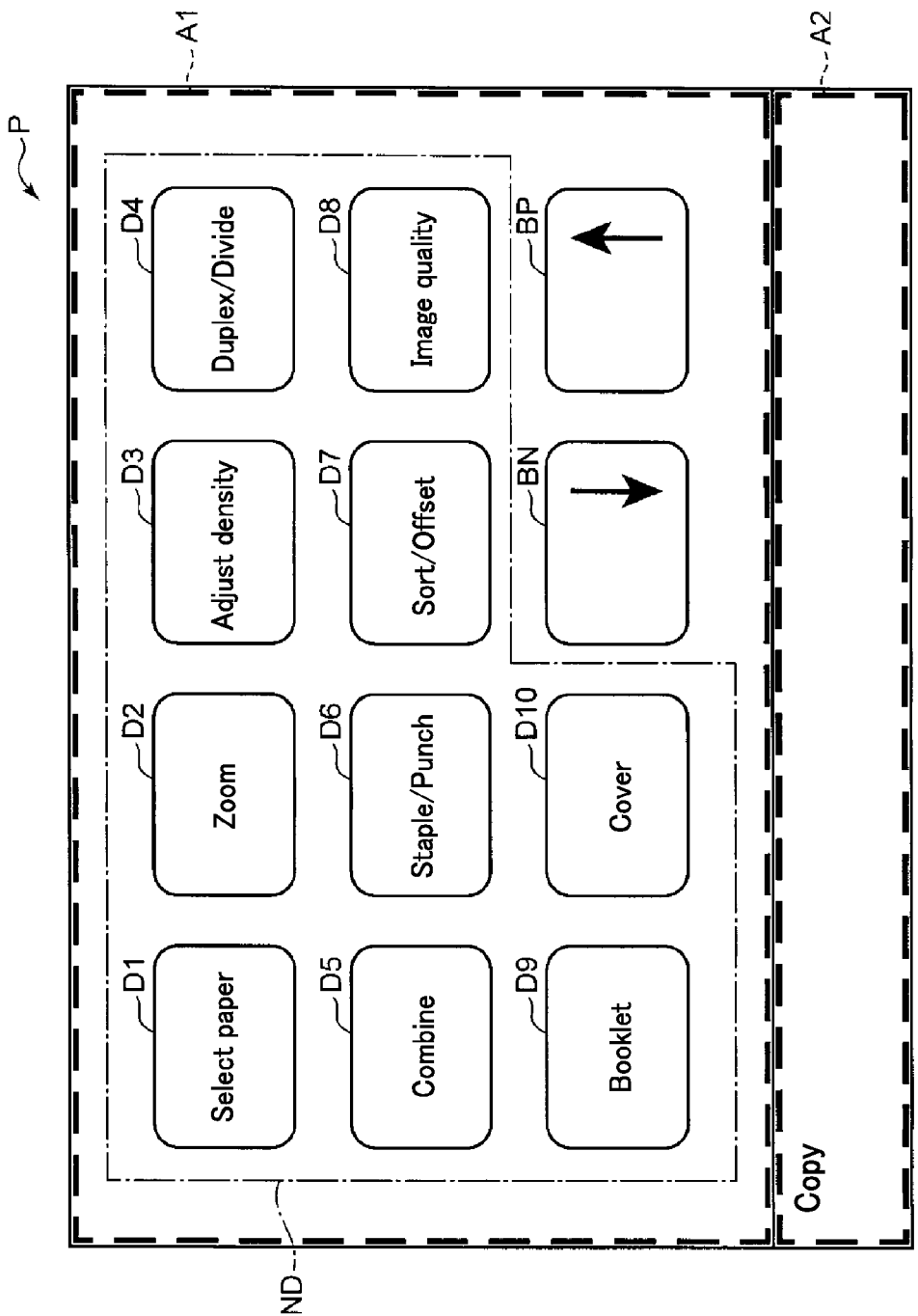
FIG. 4 is an explanatory drawing showing one example of an operation screen through which a setting content of a copy function is input according to one embodiment of the present disclosure.

The components 11-19 will be described in detail below with reference to FIGS. 4-6. FIG. 4 is an explanatory drawing showing one example of an operation screen to allow the user to input a setting content of the copy function.

When any of the switches 74a-74m is pressed, the selection instruction receiving section 11 receives a selection instruction to select an image formation related function corresponding to the pressed switch 74a-74m. For example, when the user presses the switch 74j (FIG. 2), the selection instruction receiving section 11 receives a selection instruction about the copy function.

For example, as shown in FIG. 4, the display region of the liquid crystal display device P is divided in advance into two of an option display region A1 and a message display region A2. The picture segment selection section 12 selects ten icons D1-D10 displayed in the option display region A1 as normal picture segments ND. The ten icons D1-D10 are selected from icons (picture segments) corresponding to a plurality of detailed image formation related functions (a paper selecting function, a zooming function, a density adjusting function, etc.) that can be setting contents of the copy function, for example.

Here, the number of icons displayed in the option display region A1 is not limited to ten and is set in advance for each image formation related function to be the number equal to or smaller than an upper limit of the number of icons that the option display region A1 can display according to the size of the option display region A1 and each size of the icons corresponding to the respective image formation related functions. The set number is stored in advance as a predetermined display number C in the ROM or the like.

It is noted that a soft key BN and a soft key BP to change the normal picture segments ND displayed in the option display region A1 are displayed also in the option display region A1. In the message display region A2, various messages may be displayed which relate to an image formation related function corresponding to an selection instruction received in the selection instruction receiving section 11.

When the selection instruction receiving section 11 receives a selection instruction to select an image formation related function, the number of icons corresponding to the selected function (the copy function in FIG. 4) as an image formation related function corresponding to the selection instruction may be larger than the predetermined display number C in some cases. In these cases, the provisional picture segment selection section 13 selects icons, of which number is larger than the predetermined display number C, among a plurality of icons corresponding to the selected function.

The prominent display control section 14 executes a prominent display operation during the time until a predetermined time limit T elapses after the selection instruction receiving section 11 receives a selection instruction to select an image formation related function. In the prominent display operation, the prominent display control section 14 allows the liquid crystal display device P to display the icons selected by the provisional picture segment selection section 13, of which number is larger than the predetermined display number C. The time limit T herein is set at short time of several seconds and is stored in the ROM or the like.

Figure 5:
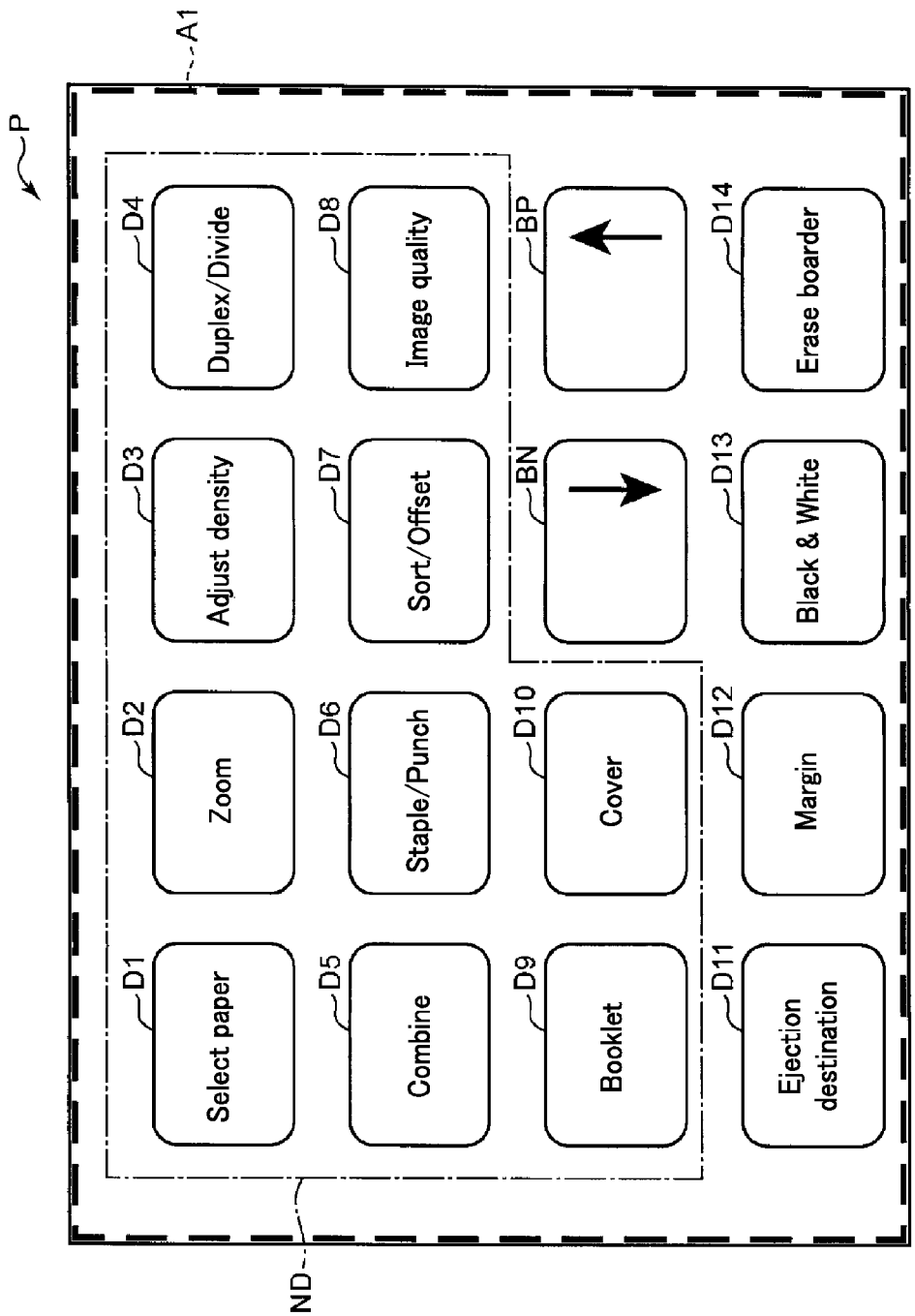
FIG. 5 is an explanatory drawing showing one example of a display section in executing a prominent display operation according to one embodiment of the present disclosure.

FIG. 5 is an explanatory drawing showing one example of the liquid crystal display device P in executing the prominent display operation. Description made below is based on an assumption that the predetermined display number C is set in advance at ten, for example, and the number of the icons corresponding to the copy function is 14.

As shown in FIG. 5, for example, the prominent display control section 14 enlarges the option display region A1 to a maximum size of the display region of the liquid crystal display device P during the time until the time limit T elapses after the selection instruction of the copy function is received. The number of the icons corresponding to the copy function as the selected function is 14, which is larger than the predetermined display number C. Accordingly, the provisional picture segment selection section 13 selects 14 icons D1-D14, of which number is larger than the predetermined display number C, among the 14 icons corresponding to the copy function. Then, the prominent display control section 14 allows the 14 icons selected by the provisional picture segment selection section 13 to be displayed in the enlarged option display region A1.

When the time limit T elapses after the selection instruction receiving section 11 receives the selection instruction to select the image formation related function, the prominent display control section 14 terminates the prominent display operation. The normal display control section 15 performs an operation to allow the picture segment selection section 12 to select the predetermined display number C of icons as the normal picture segments ND among the plural icons corresponding to the selected function and performs a normal display operation to display the normal picture segments ND in the option display region A1. Further, the normal display control section 15 size reduces the option display region A1 enlarged in the prominent display operation up to be the display region in set size.

Specifically, when the time limit T elapses after the selection instruction receiving section 11 receives the selection instruction of the copy function, the prominent display operation is terminated. The normal display control section 15 allows the picture segment selection section 12 to select ten icons D1-D10, of which number is equal to the predetermined display number C, as the normal picture segments ND among the 14 icons corresponding to the copy function, as shown in FIG. 4, for example.

Then, the normal display control section 15 size reduces the enlarged option display region A1 (FIG. 5) to the display region in the originally set size. Thereafter, the normal display control section 15 allows the option display region A1 after size reduction to display the normal picture segments ND of the icons D1-D10 selected by the picture segment selection section 12 and allows the message display region A2 to display a massage relating to the copy function.

The switching instruction receiving section 16 receives a picture segment switching instruction as an instruction to change the normal picture segments ND displayed in the option display region A1. Specifically, as shown in FIG. 4, for example, when the user presses the soft key BN or the soft key BP, the switching instruction receiving section 16 receives the picture segment switching instruction.

When the switching instruction receiving section 16 receives the picture segment switching instruction, the number of icons corresponding to a selected function may be larger than the predetermined display number C in some cases. At this time, the display switching control section 17 executes an operation to allow the picture segment selection section 12 to newly select other normal picture segments ND (a second picture segment group), rather than the normal picture segments ND (a first picture segment group) displayed in the option display region A1. Accordingly, the picture segment selection section 12 selects icons of which number is equal to or smaller than the predetermined display number C as new normal segments ND (the second picture segment group) among the plurality of icons corresponding to the selected function, rather than the normal picture segments ND (the first picture segment group). Further, the display switching control section 17 executes a display switching operation to display in the option display region A1 the normal picture segments ND (the second picture segment group) newly selected by the picture segment selection section 12.

For example, as shown in FIG. 4, when the soft key BN is pressed in the state when the normal picture segments ND of the icons D1-D10 are displayed in the option display region A1, the switching instruction receiving section 16 receives a picture segment switching instruction.

Figure 6:
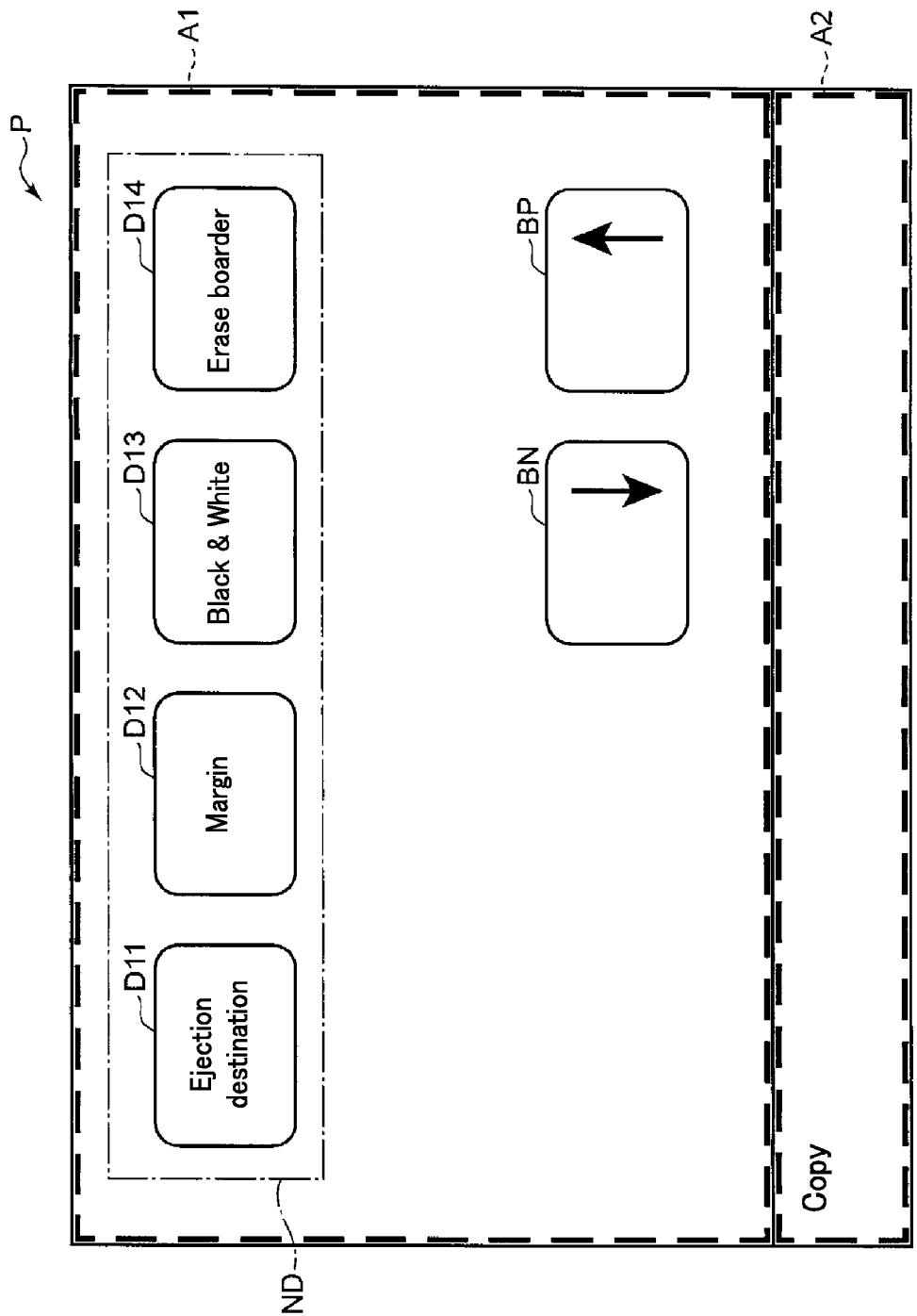
FIG. 6 is an explanatory drawing showing one example of the display section in executing a display switching operation according to one embodiment of the present disclosure.

FIG. 6 is an explanatory drawing showing one example of the liquid crystal display device P in executing the display switching operation. When the switching instruction receiving section 16 receives the picture segment switching instruction, the number of icons corresponding to the copy function is larger than the predetermined display number C. Accordingly, as shown in FIG. 6, for example, the display switching control section 17 controls the picture segment selection section 12 to newly select four icons D11-D14, of which number is equal or smaller than the predetermined display number C, as normal picture segments ND, rather than the normal picture segments ND of the icons D1-D10. Then, the display switching control section 17 performs the display switching operation to allow the normal picture segments ND of four icons D11-D14 newly selected by the picture segment selection section 12 to be displayed in the option display region A1.

It is noted that, as shown in FIG. 6, for example, even when the soft key BP is pressed in the state in which the normal picture segments ND of the icons D11-D14 are displayed in the option display region A1 as the first picture segment group, the switching instruction receiving section 16 receives the picture segment switching instruction. At this time, as shown in FIG. 4, for example, the display switching control section 17 controls the picture segment selection section 12 to newly select ten icons D1-D10, of which number is equal to the predetermined display number C, as the normal picture segments ND, rather than those in the first picture group of the icons D11-D14. Then, the display switching control section 17 performs the display switching operation to allow the normal picture segments ND of the ten icons D1-D10 newly selected by the picture segment selection section 12 to be displayed in the option display region A1.

Figure 7:
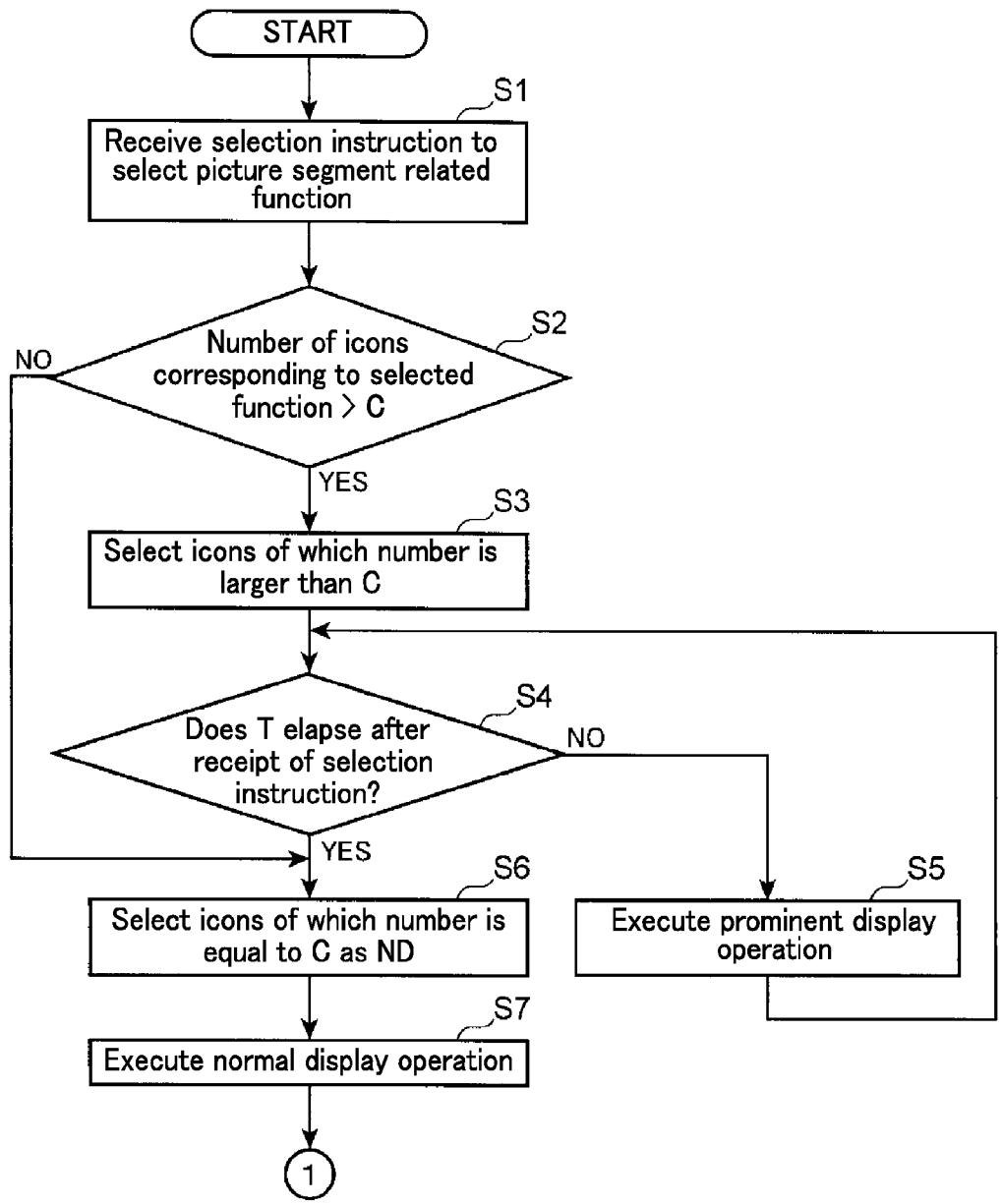
FIG. 7 is a flowchart depicting one example of a first half of an operation that allows the user to select a picture segment according to one embodiment of the present disclosure.

Operations of the respective components 11-17 to allow the user to select an icon will be described in detail next with reference to FIGS. 7 and 8. FIG. 7 is a flowchart depicting one example of a first half of an operation to allow the user to select an icon.

As shown in FIG. 7, for example, when the user presses any one of the switches 74a-74m (FIG. 2), the selection instruction receiving section 11 receives a selection instruction to select an image formation related function corresponding to the pressed switch 74a-74m (S1). When the number of the icons corresponding to the selected function is larger than the predetermined display number C upon receipt of the selection instruction to select the function by the selection instruction receiving section 11 (YES in S2), the provisional picture segment selection section 13 selects icons, of which number is larger than the predetermined display number C, among a plurality of icons corresponding to the selected function (S3).

During the time when the time limit T elapses after the selection instruction receiving section 11 receives the selection instruction to select the image formation related function (NO in S4), the prominent display control section 14 executes the prominent display operation (S5). In the prominent display operation, as shown in FIG. 5, for example, the icons, of which number is larger than the predetermined display number C, selected by the provisional picture segment selection section 13 are displayed in the enlarged option display region A1.

Subsequently, when the time limit T elapses after the selection instruction receiving section 11 receives the selection instruction to select the image formation related function (YES in S4), or when the number of the icons corresponding to the selected function is equal to or smaller than the predetermined display number C in step S2 (NO in S2), the normal display control section 15 allows the picture segment selection section 12 to select icons, of which number is equal to the predetermined display number C, as the normal picture segments ND among the icons corresponding to the selected function (S6).

Thereafter, the normal display control section 15 executes the normal display operation (S7). As shown in FIG. 4, for example, in the normal display operation, the option display region A1 is size reduced to the initially set size and displays the normal picture segments ND selected by the picture segment selection section 12 in step S6 after the size reduction. Further, a message relating to the selected function is displayed in the message display region A2.

Figure 8:
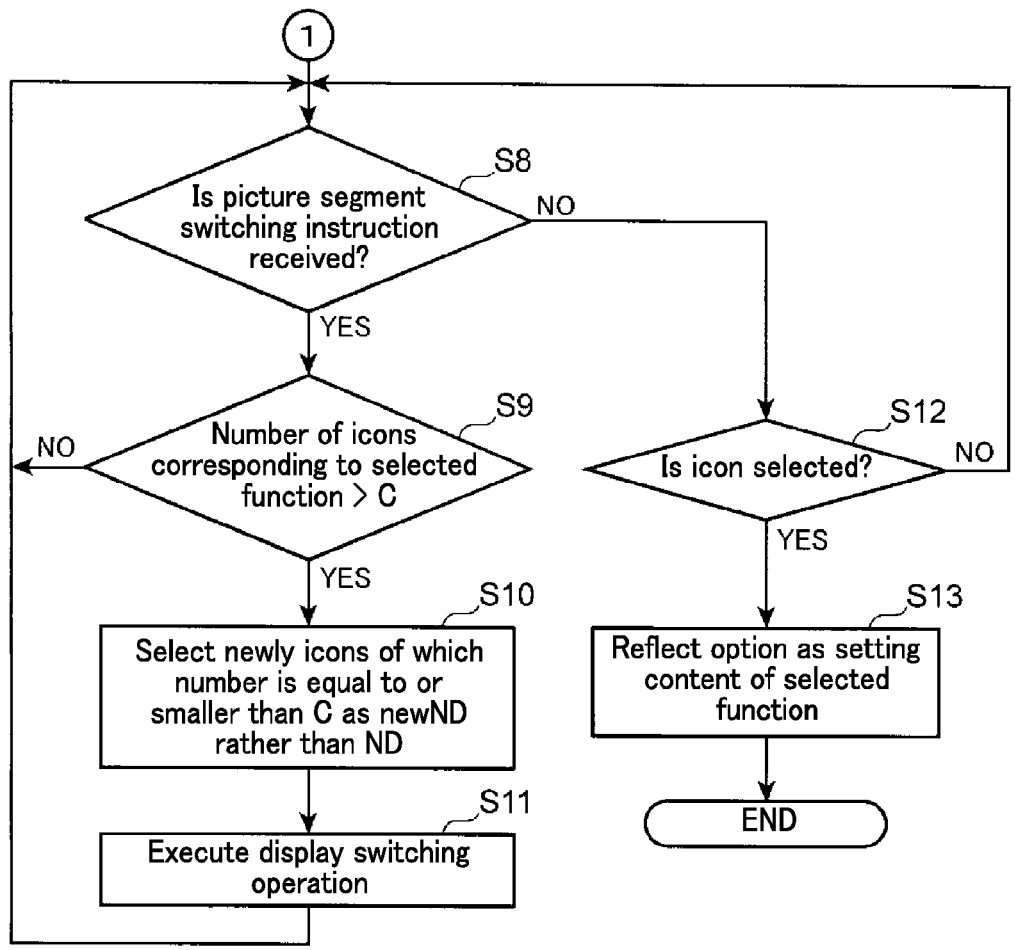
FIG. 8 is a flowchart depicting one example of a latter half of the operation that allows the user to select the picture segment according to one embodiment of the present disclosure.

FIG. 8 is a flowchart showing one example of a latter half of the operation to allow the user to select an icon. As shown in FIG. 8, for example, when the number of the icons corresponding to the selected function is larger than the predetermined display number C (YES in S9) where the soft key BN or the soft key BP (FIGS. 4-6) is pressed so that the switching instruction receiving section 16 receives the picture segment switching instruction (YES in S8), the display switching control section 17 controls the picture segment selection section 12 to select icons as new normal picture segments ND (S10). The new normal picture segments ND at this time are icons, of which number is equal to or smaller than the predetermined display number C among the icons corresponding to the selected function, rather than the normal picture segments ND. Next, the display switching control section 17 executes the display switching operation (S11). Then, the routine returns to step S8. The display switching operation in step S11 results in display of the new normal picture segments ND, which are newly selected by the picture segment selection section 12 in step S10, in the option display region A1.

It is noted that when the number of the icons corresponding to the selected function is not larger than the predetermined display number C in step S9 (NO in S9), the routine directly returns to step S8.

Further, when the user selects any of the icons (YES in S12) in the state in which the normal display operation or the display switching operation results in display of the normal picture segments ND in the option display region A1, and where the switching instruction receiving section 16 receives no picture segment switching instruction (NO in S8), an option corresponding to the selected icon is reflected as a setting content of the selected function (S13). By contrast, during the time when the user selects no icon (NO in S12), returning to step S8 is repeated.

As described above, with the configuration according to Embodiment 1, picture segments, of which number is larger than the predetermined display number C, are displayed during the predetermined time limit T. This can allow the user to notice the presence of picture segments that can be the setting contents of the corresponding image formation related function.

Further, according to the configuration of Embodiment 1, after the picture segments, of which number is larger than the predetermined display number C, are displayed as options during the predetermined time limit T, the icons, of which number is equal to the predetermined display number C, are displayed. Accordingly, the user can see change in the number of the options that can be the setting contents of the selected function. Thus, the user can easily notice that the number of the options that can be the setting contents of the selected function is larger than the predetermined display number C, thereby reducing a risk of ignoring the presence of the options that can be the setting contents of each image formation related function.

Moreover, with the configuration of Embodiment 1, the user can see the liquid crystal display device P displaying, different from the usual one, an aspect in which the option display region A1 is enlarged so that icons, of which number is larger than the usual number, are displayed. This enables the user to easily notice that the number of the options that can be the setting contents of the selected function is larger than the predetermined display number C, thereby reducing a risk of ignoring the presence of the options that can be the setting contents of each image formation related function.

Furthermore, with the configuration of Embodiment 1, even if no desired icon is displayed in the option display region A1, the user can allow the switching instruction receiving section 16 to receive the picture segment switching instruction by pressing the soft key BN or the soft key BP shown in FIGS. 4-6, or the like. Accordingly, display switching enables a desired icon to be displayed in the option display region A1.

It is noted that the configuration shown in FIGS. 1-7 in Embodiment 1 is a mere example and not intended to limit the present disclosure to the embodiment.

Embodiment 2

Figure 9:
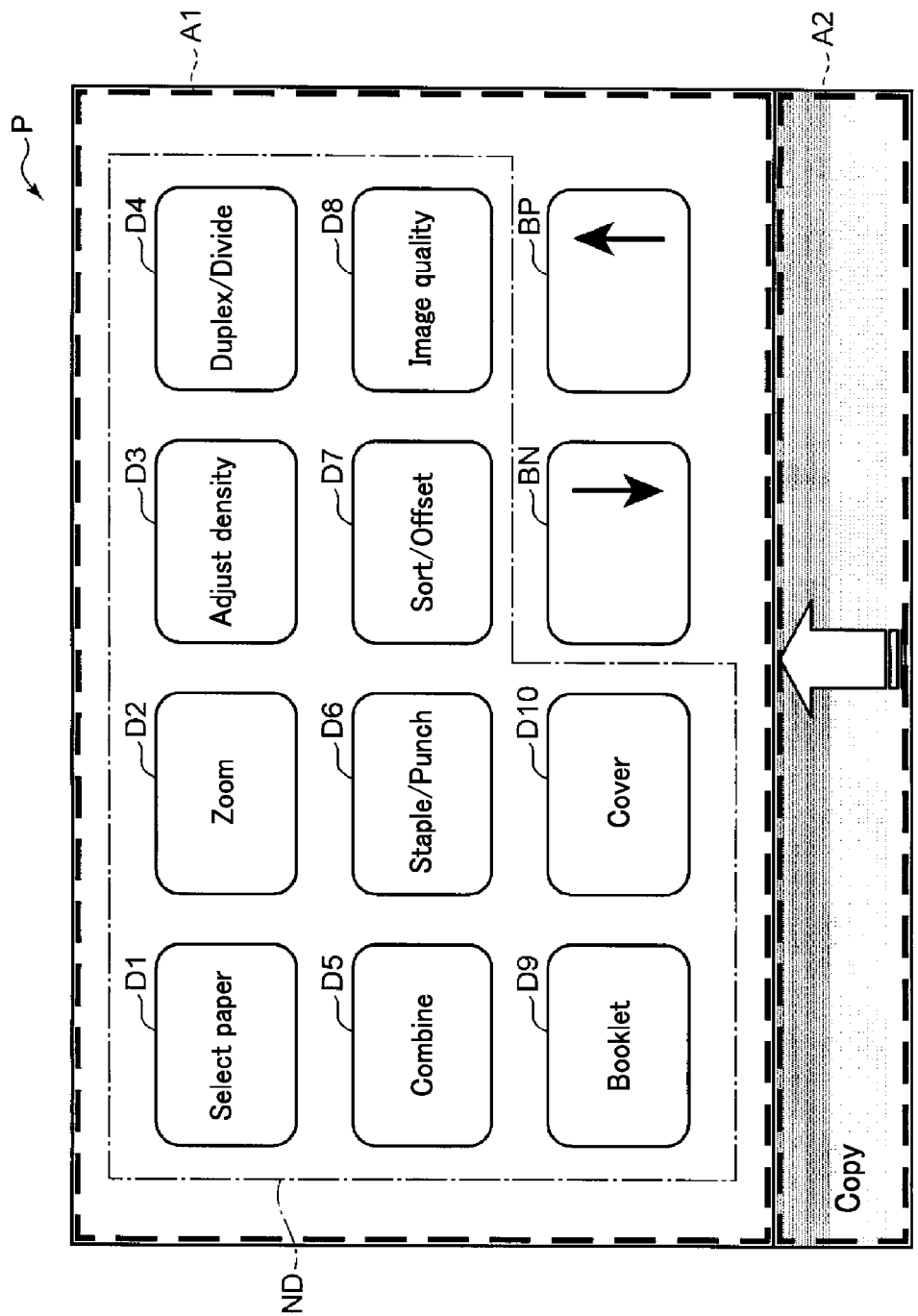
FIG. 9 is an explanatory drawing showing one example of the display section in executing a normal display operation according to one embodiment of the present disclosure.

FIG. 9 is an explanatory drawing showing one example of the liquid crystal display device P in executing the normal display operation. As shown in FIG. 9, for example, the normal display control section 15 may gradually size reduce the enlarged option display region A1 to the set size in the normal display operation.

According to the configuration of Embodiment 2, the user can see gradual size reduction of the enlarged option display region A1, thereby allowing the user to easily notice that the option display region A1 has been enlarged. Thus, the user can easily notice that the number of the options that can be the setting contents of the selected function is larger than the predetermined display number C, thereby reducing a risk of ignoring the presence of the options that can be the stetting contents of each image formation related function.

Embodiment 3

Figure 10:
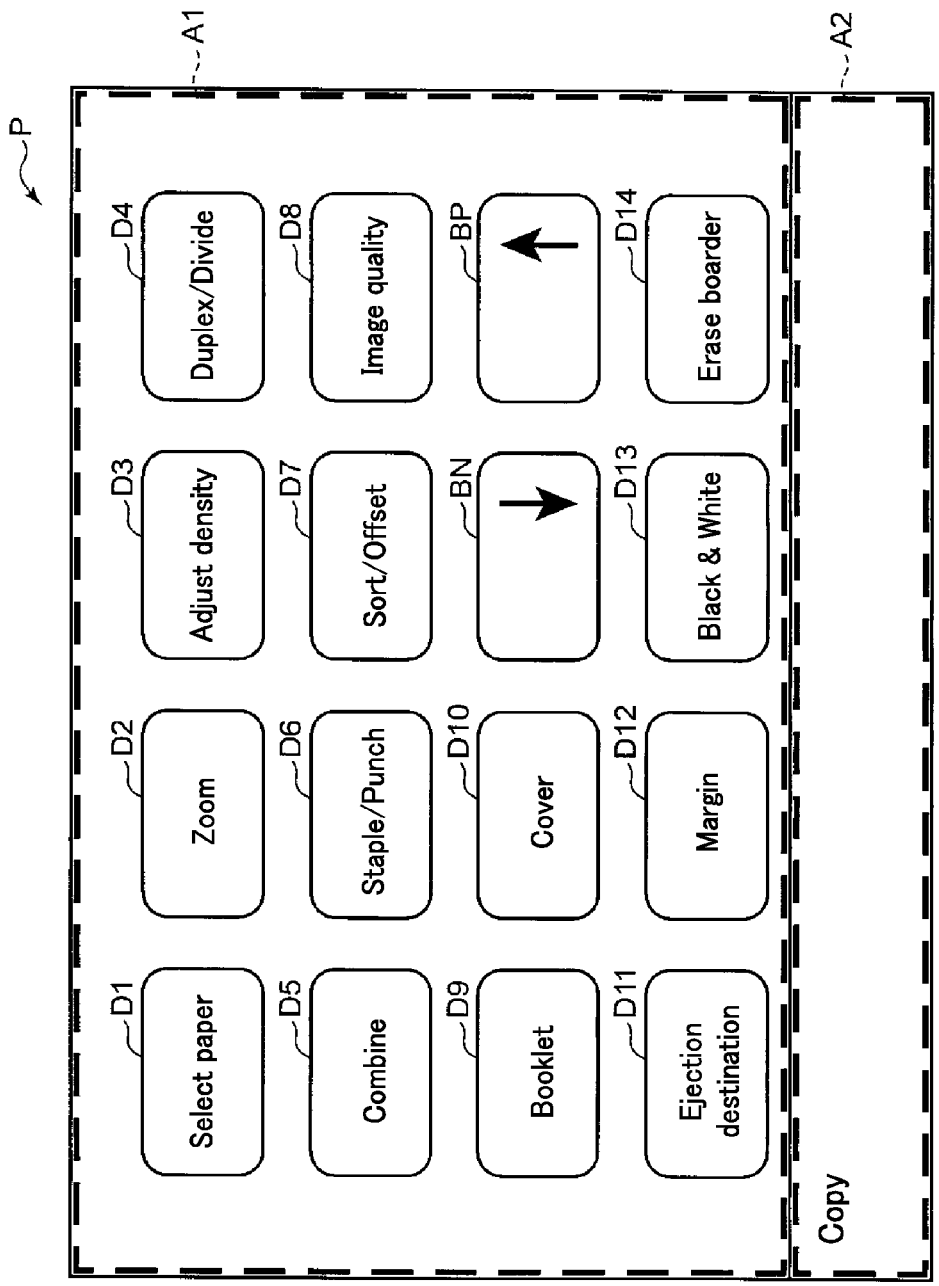
FIG. 10 is an explanatory drawing showing one example of the display section in executing the prominent display operation other than the example shown in FIG. 5 according to one embodiment of the present disclosure.

FIG. 10 is an explanatory drawing showing one example of the liquid crystal display device P in executing the prominent display operation other than that shown in FIG. 5. In Embodiments 1 and 2, as shown in FIG. 5, for example, the prominent display control section 14 is configured to enlarge the option display region A1 to display icons, of which number is larger than the predetermined display number C, selected by the provisional picture segment selection section 13 in the enlarged option display region A1 in the prominent display operation.

However, in place of the above configuration, as shown in FIG. 10, for example, the prominent display control section 14 may be configured to size reduce the 14 icons D1-D14, of which number is larger than the predetermined display number C, selected by the provisional picture segment selection section 13 so as to display them within the option display region A1 in the prominent display operation. In combination, the normal display control section 15 may be configured not to size reduce the enlarged option display region A1 to the set size in the normal display operation.

According to Embodiment 3, the user can see the liquid crystal display device P displaying different from the usual one, an aspect in which icons, of which number is larger than the normal number, are size reduced and displayed in the option display region A1. This enables the user to easily notice that the number of the options that can be the setting contents of the options is larger than the predetermined display number C, thereby reducing a risk of ignoring the presence of the options that can be the setting contents of each image formation related function.

Embodiment 4

Alternatively, in the configuration described in Embodiment 3, the provisional picture segment selection section 13 may be configured to select all the icons, of which number is large than the predetermined display number C, corresponding to the selected function.

Figure 11:
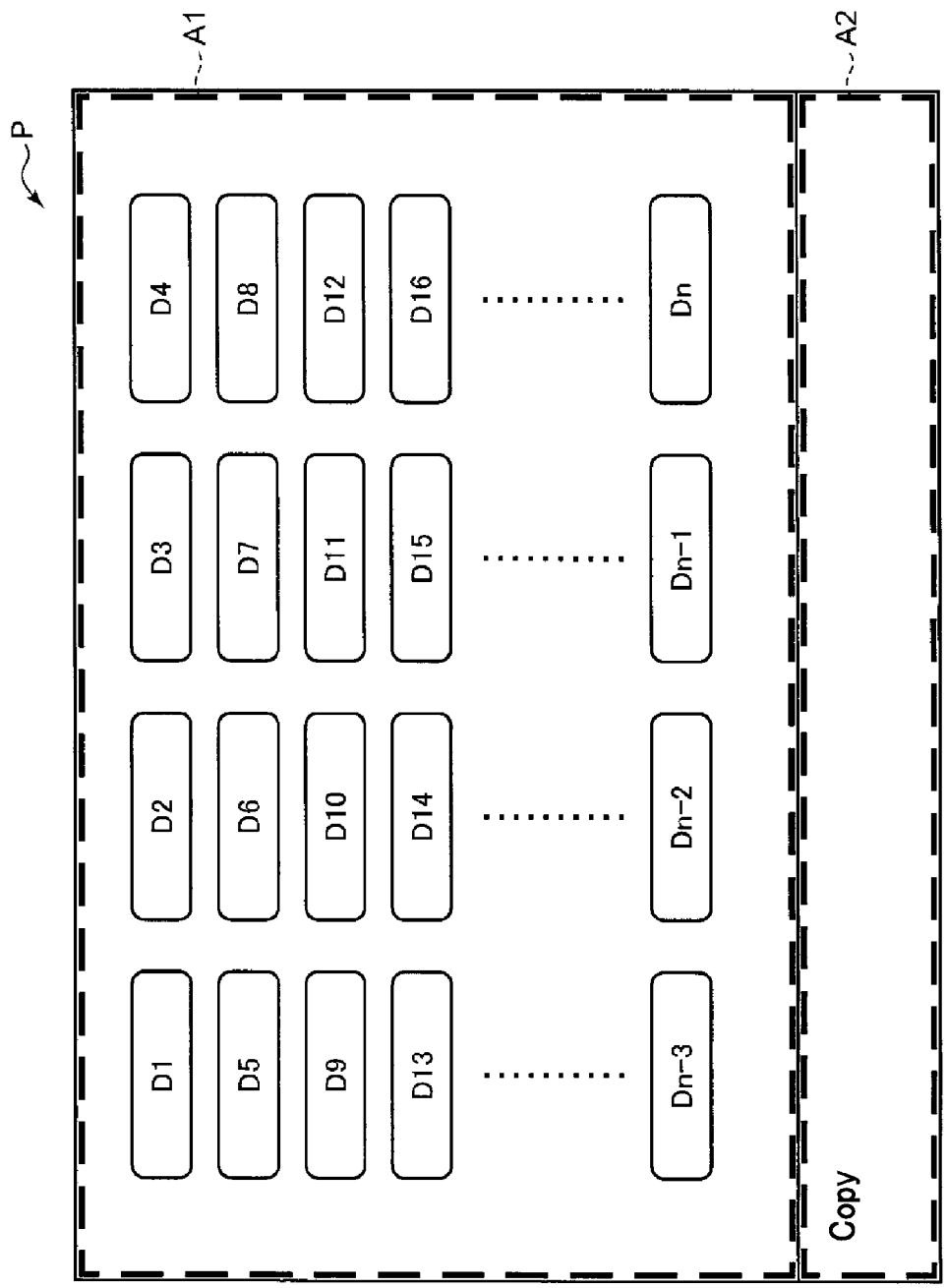
FIG. 11 is an explanatory drawing showing one example of the display section in executing the prominent display operation other than the examples shown in FIGS. 5 and 10 according to one embodiment of the present disclosure.

Detailed description will be made below. FIG. 11 is an explanatory drawing showing one example of the liquid crystal display device P in executing the prominent display operation other than those shown in FIGS. 5 and 10. For example, given that the number of the icons corresponding to the selected function is n, which is larger than the predetermined display number C. The provisional picture segment selection section 13 may select all the n icons corresponding to the selected function. Then, the prominent display control section 14 size reduces the n icons D1-Dn selected by the provisional picture segment selection section 13 to displays them within the option display region A1 in the prominent display operation, as shown in FIG. 11, for example.

With the configuration according to Embodiment 4, the user can confirm the number of icons displayed in the option display region A1 or check the degree of size reduction of the icons to intuitively grasp the magnitude of the number of the options corresponding to the selected function.

Embodiment 5

Furthermore, in the configuration according to any of Embodiments 1-4, the control unit 10 may be configured to further function as a frequency storing control section 18 to store a frequency of icon selection. In combination, the picture segment selection section 12 may be configured to select icons selected as the normal picture segments ND in descending order of the selection frequency stored in the frequency storing control section 18.

Specifically, each time the user selects an icon in step S12 (YES in S12), as shown in FIG. 8, for example, the frequency storing control section 18 may increment the accumulated number of times of selection of the icon and store it in the RAM in association with information for icon identification. It is noted that the user's operation on the operation unit 7 can set the accumulated number of times stored in the RAM at zero (reset). In other words, the accumulated number of times stored in the RAM by the frequency storing control section 18 represents the selection frequency of each icon during the time until the user's reset.

In combination, the picture segment selection section 12 may select icons, of which number is equal to the predetermined display number C, in descending order of the accumulated number of times of selection of each icon stored by the frequency storing control section 18 in step S6. Further, the picture segment selection section 12 may select, rather than the normal picture segments ND, icons, of which number is equal to or smaller than the predetermined display number C, in descending order of the accumulated number of times of selection of each icon stored by the frequency storing control section 18 in step S10.

With the configuration according to Embodiment 5, icons are selected as the usual picture segments ND in descending order of the selection frequency. Accordingly, the user can change the icons displayed in the option display region A1 to select a desired icon from the icons displayed in descending order of the selection frequency in the option display region A1. Thus, the user can perform selection efficiently.

Moreover, the control unit 10 may be simplified so as not to function as the switching instruction receiving section 16 and the display switching control section 17 in any of the configurations in Embodiments 1-4. In combination, steps S8-11 (FIG. 8) may not be performed so that step S12 is performed after step S7.

Furthermore, in the above embodiments, description has been made about the configurations in which the image forming apparatus according to the present disclosure is applied to the multifunction peripheral 1. The present disclosure is not limited to the embodiments and may be applied to any of scanners, facsimile machines, and copiers.

What is claimed is:

1. An image forming apparatus comprising:
a display section configured to display a plurality of picture segments; and
a control unit configured to execute a display operation to display the plurality of picture segments;
wherein the plurality of picture segments correspond to a plurality of options corresponding to an image formation related function,
the control unit executes a picture segment selection operation to select picture segments, of which number is equal to a predetermined display number, as normal picture segments among the plurality of picture segments,
the control unit executes a prominent display operation to select picture segments, of which number is larger than the predetermined display number, as provisional picture segments among the plurality of picture segments and to allow the display section to prominently display the provisional picture segments during a predetermined prominent display time.

2. The image forming apparatus of claim 1, wherein
the control unit executes a normal display operation to terminate the prominent display operation after the predetermined prominent display time elapses and to allow the display section to display the normal picture segments.

3. The image forming apparatus of claim 2, wherein
the control unit executes a selection instruction receiving operation to receive a selection instruction to select the image formation related function,
the control unit executes the prominent display operation upon receipt of the selection instruction to select the image formation related function, and
the control section executes the normal display operation when the prominent display time elapses after the selection instruction to select the image formation related function is received.

4. The image forming apparatus of claim 1, wherein
the control unit controls the image formation related function.

5. The image forming apparatus of claim 2, wherein
the display section includes an option display region as a display region set to a set size,
the control unit enlarges the option display region, sets the enlarged option display region as a provisional picture segment display region, and allows the provisional picture segments to be displayed in the provisional picture segment display region in the prominent display operation, and
the control unit size reduces the provisional picture segment display region to size corresponding to size of the option display region in the normal display operation.

6. The image forming apparatus of claim 5, wherein
the control unit gradually size reduces the provisional picture segment display region to the size corresponding to the size of the option display region in the normal display operation.

7. The image forming apparatus of claim 1, wherein
the control unit size reduces picture segments, of which number is larger than the predetermined display number, so that the picture segments are displayed within the display section in the prominent display operation.

8. The image forming apparatus of claim 7, wherein
the control unit selects all the plurality of picture segments as the provisional picture segments.

9. The image forming apparatus of claim 5, wherein
the control unit selects the normal picture segments, of which number is equal to the predetermined display number, as a first normal picture segment group among the plurality of picture segment and allows the first normal picture segment group to be displayed in the option display region, and upon receipt of a switching instruction, the control unit selects the plurality of picture segments, of which number is equal to or smaller than the predetermined display number, as a second normal picture segment group among the plurality of picture segment, rather than the first normal picture segment group and executes a display switching operation to allow the second normal picture segment group to be displayed in the option display region.

10. The image forming apparatus of claim 9, wherein
the control unit executes a frequency storing control operation to store frequency of selection of each of the picture segments, and the control unit selects the normal picture segments in descending order of the frequency of selection stored in the frequency storing control operation.

* * * * *